(12) United States Patent
Keskar et al.

(10) Patent No.: US 11,281,863 B2
(45) Date of Patent: Mar. 22, 2022

(54) SYSTEMS AND METHODS FOR UNIFYING QUESTION ANSWERING AND TEXT CLASSIFICATION VIA SPAN EXTRACTION

(71) Applicant: salesforce.com, inc., San Francisco, CA (US)

(72) Inventors: Nitish Shirish Keskar, San Bruno, CA (US); Bryan McCann, Palo Alto, CA (US); Richard Socher, Menlo Park, CA (US); Caiming Xiong, Menlo Park, CA (US)

(73) Assignee: salesforce.com, inc., San Francisco, CA (US)

( * ) Notice: Subject to any disclaimer, the term of this patent is extended or adjusted under 35 U.S.C. 154(b) by 255 days.

(21) Appl. No.: 16/518,905

(22) Filed: Jul. 22, 2019

(65) Prior Publication Data
US 2020/0334334 A1    Oct. 22, 2020

Related U.S. Application Data

(60) Provisional application No. 62/835,845, filed on Apr. 18, 2019.

(51) Int. Cl.
*G06F 16/332*     (2019.01)
*G06F 40/30*      (2020.01)
*G06F 40/284*     (2020.01)
*G06N 3/08*       (2006.01)

(52) U.S. Cl.
CPC .......... *G06F 40/30* (2020.01); *G06F 40/284* (2020.01); *G06F 16/3329* (2019.01); *G06N 3/08* (2013.01)

(58) Field of Classification Search
CPC .............................. G06N 3/08; G06F 16/3329
See application file for complete search history.

(56) References Cited

U.S. PATENT DOCUMENTS

| 10,282,663 B2 | 5/2019 | Socher et al. |
| 10,346,721 B2 | 7/2019 | Albright et al. |

(Continued)

OTHER PUBLICATIONS

Ba et al., "Layer normalization," Conference on Neural Informaiton Processing Systems 2016 Deep Learning Symposium, pp. 1-14.

(Continued)

*Primary Examiner* — Feng-Tzer Tzeng
(74) *Attorney, Agent, or Firm* — Haynes and Boone, LLP

(57) ABSTRACT

Systems and methods for unifying question answering and text classification via span extraction include a preprocessor for preparing a source text and an auxiliary text based on a task type of a natural language processing task, an encoder for receiving the source text and the auxiliary text from the preprocessor and generating an encoded representation of a combination of the source text and the auxiliary text, and a span-extractive decoder for receiving the encoded representation and identifying a span of text within the source text that is a result of the NLP task. The task type is one of entailment, classification, or regression. In some embodiments, the source text includes one or more of text received as input when the task type is entailment, a list of classifications when the task type is entailment or classification, or a list of similarity options when the task type is regression.

18 Claims, 9 Drawing Sheets

(56) References Cited

U.S. PATENT DOCUMENTS

| | | | |
|---|---|---|---|
| 2013/0006641 A1* | 1/2013 | Brown | G06F 16/3329 |
| | | | 704/270.1 |
| 2016/0350653 A1* | 12/2016 | Socher | G06N 5/04 |
| 2017/0024645 A1 | 1/2017 | Socher et al. | |
| 2017/0032280 A1 | 2/2017 | Socher et al. | |
| 2017/0140240 A1 | 5/2017 | Socher et al. | |
| 2017/0323636 A1* | 11/2017 | Xiao | G06F 40/289 |
| 2018/0082171 A1 | 3/2018 | Merity et al. | |
| 2018/0096219 A1 | 4/2018 | Socher et al. | |
| 2018/0121787 A1 | 5/2018 | Hashimoto et al. | |
| 2018/0121788 A1 | 5/2018 | Hashimoto et al. | |
| 2018/0121799 A1 | 5/2018 | Hashimoto et al. | |
| 2018/0129931 A1 | 5/2018 | Bradbury et al. | |
| 2018/0129937 A1 | 5/2018 | Bradbury et al. | |
| 2018/0129938 A1* | 5/2018 | Xiong | G06N 5/022 |
| 2018/0143966 A1 | 5/2018 | Lu et al. | |
| 2018/0144208 A1 | 5/2018 | Lu et al. | |
| 2018/0144248 A1 | 5/2018 | Lu et al. | |
| 2018/0268287 A1 | 9/2018 | Johansen et al. | |
| 2018/0268298 A1 | 9/2018 | Johansen et al. | |
| 2018/0336198 A1 | 11/2018 | Zhong et al. | |
| 2018/0336453 A1 | 11/2018 | Merity et al. | |
| 2018/0349359 A1 | 12/2018 | Mccann et al. | |
| 2018/0373682 A1 | 12/2018 | Mccann et al. | |
| 2018/0373987 A1 | 12/2018 | Zhang et al. | |
| 2019/0130206 A1 | 5/2019 | Trott et al. | |
| 2019/0130248 A1 | 5/2019 | Zhong et al. | |
| 2019/0130273 A1 | 5/2019 | Keskar et al. | |
| 2019/0130312 A1 | 5/2019 | Xiong et al. | |
| 2019/0130896 A1 | 5/2019 | Zhou et al. | |
| 2019/0130897 A1 | 5/2019 | Zhou et al. | |
| 2019/0149834 A1 | 5/2019 | Zhou et al. | |
| 2019/0188568 A1 | 6/2019 | Keskar et al. | |
| 2019/0213482 A1 | 7/2019 | Socher et al. | |
| 2019/0251168 A1 | 8/2019 | McCann et al. | |
| 2019/0251431 A1 | 8/2019 | Keskar et al. | |

OTHER PUBLICATIONS

Bar-Haim et al., "The Second PASCAL Recognising Textual Entailment Challenge," Proceedings of the Second PASCAL Challenges Workshop on Recognising Textual Entailment vol. 6: 6-14, 2006, pp. 1-9.

Bentivogli et al., "The Fifth PASCAL Recognizing Textual Entailment Challenge," Textual Analysis Conference 2009 Workshop, pp. 1-15.

Clark et al., "BAM! Born-Again Multi-Task Networks for Natural Language Understanding," 2019 Annual Meeting of the Association for Computational Linguistics, pp. 1-7.

Cer et al., "SemEval-2017 Task 1: Semantic Textual Similarity-Multilingual and Cross-lingual Focused Evaluation," SemEval Workshop at 2017 Annual Meeting of the Association for Computational Linguistics, pp. 1-14.

Collobert et al., "A Unified Architecture for Natural Language Processing: Deep Neural Networks with Multitask Learning," Proceedings of the 25th International Conference on Machine Learning, 2008, pp. 1-8.

Collobert et al., "Natural Language Processing (Almost) from Scratch," Journal of Machine Learning Research 12, 2011, pp. 2493-2537.

Conneau et al., "Xnli: Evaluating Cross-lingual Sentence Representations," 2018 Conference on Empirical Methods in Natural Language Processing, pp. 1-12.

Dagan et al., "Recognizing textual entailment: Rational, evaluation and approaches-erratum," Natural Language Engineering, 16(1): 105, 2009, pp. 1-18.

Devlin et al., "BERT: Pre-training of Deep Bidirectional Transformers for Language Understanding," 2018 O'Reilly Artificial Intelligence Conference, pp. 1-14.

Dolan et al., "Automatically Constructing a Corpus of Sentential Paraphrases," Proceedings of the Third International Workshop on Paraphrasing, 2005, pp. 1-8.

Giampiccolo et al., "The Third PASCAL Recognizing Textual Entailment Challenge," Proceedings of the ACL-PASCAL Workshop on Textual Entailment and Paraphrasing, 2007, pp. 1-9.

He et al., "Deep Residual Learning for Image Recognition," Proceedings of the IEEE Conference on Computer Vision and Pattern Recognition, 2016, pp. 770-778.

He et al., "Question-Answer Driven Semantic Role Labeling: Using Natural Language to Annotate Natural Language," Proceedings of the 2015 Conference on Empirical Methods in Natural language Processing, pp. 643-653.

Howard et al., "Universal Language Model Fine-tuning for Text Classification," 2018 Annual Meeting of the Association for Computational Linguistics, pp. 1-12.

Joshi et al., "TriviaQA: A Large Scale Distantly Supervised Challenge Dataset," 2017 Annual Meeting of the Association for Computational Linguistics, 1-11.

Levesque et al., "The Winograd Schema Challenge," Thirteenth International Conference on the Principles of Knowledge Representation and Reasoning, 2012, pp. 1-10.

Levy et al., "Zero-Shot Relation Extraction via Reading Comprehension," 2017 SIGNLL Conference on Computational Natural Language Learning, pp. 1-10.

Liu et al., "Multi-Task Deep Neural Networks for Natural Language Understanding," 2019 Annual Meeting of the Association for Computational Linguistics, pp. 1-10 2019.

McCann et al., "Learned in Translation: Contextualized Word Vectors," Advances in Neural Information Processing Systems 30, 2017, pp. 6297-6308. https://papers.nips.cc/paper/7209-learned-in-translation-contextualized-word-vectors.pdf 2017.

McCann et al., "The Natural Language Decathlon: Multitask Laerning as Quesiton Answering," Seventh International Conference on Learning Representations, 2018, pp. 1-23 2018.

Nair et al., "Rectified Linear Unite Improve Restricted Boltzmann Machines," Proceedings of the 27th International Conference on International Conference on Machine Learning, 2010, pp. 807-814. https://icml.cc/Conferences/2010/papers/432.pdf 2010.

Paszke et al., "Automatic differentiation in PyTorch," Neural Information Processing Systems 2017 Autodiff Workshop, pp. 1-4. https://openreview.net/pdf?id=BJJsrmfCZ 2017.

Peters et al., "Deep contextualized word representations," 2018 Conference of the North American Chapter of the Association for Computational Linguistics, pp. 1-15 2018.

Phang et al., "Sentence Encoders on STILTs: Supplementary Training on Intermediate Labeled-data Tasks," 2018, pp. 1-9. arXiv:1811. 01088 2018.

Radford et al., "Improving Language Understanding by Generative Pre-Training," 2018, 1-12. https://www.cs.ubc.ca/~amuham01/LING530/papers/radford2018improving.pdf 2018.

Radford et al., "Language Models are Unsupervised Multitask Learners," 2019, pp. 1-24. https://persagen.com/files/misc/radford2019language.pdf 2019.

Rajpurkar et al., "SQuAD: 100,000+ Questions for Machine Comprehension of Text," 2016 Conference on Empirical Methods in Natural Language Processing, pp. 1-10.

Socher et al., "Recursive Deep Models for Semantic Compositionality Over a Sentiment Treebank," Proceedings of the 2013 Conference on Empirical Methods in Natural Language Processing, pp. 1631-1642.

Talmor et al., "COMMONSENSEQA: A Quesiton Answering Challenge Targeting Commonsense Knowledge," Proceedings of the 2019 Annual Conference of the North American Chapter of the Association for Computational Linguistics, pp. 4149-4158.

Vaswani et al., "Attention Is All You Need," Advances in Neural Information Processing Systems 30, 2017, pp. 6000-6010.

Wang et al., "GLUE: A Multi-Task Benchmark and Analysis Platform for Natural Language Understanding," Seventh International Conference on Learning Representations 2019, submitted 2018, pp. 1-20.

Williams et al., "A Broad-Coverage Challenge Corpus for Sentence Understanding through Inference," Proceedings of the 2018 Conference of the North American Chapter of the Association for Computational Linguistics: Human Language Technologies, vol. 1, pp. 1112-1122.

(56) References Cited

OTHER PUBLICATIONS

Xiong et al., "Dynamic Coattention Networks For Question Answering," Fifth International Conference on Learning Representations 2017, submitted 2016, pp. 1-14.

* cited by examiner

| | SST | MRPC | QQP | MNLI | RTE | QNLI | CoLA | STS | GLUE |
|---|---|---|---|---|---|---|---|---|---|
| # Train Ex. | 67k | 3.7k | 364k | 393k | 2.5k | 105k | 8.5k | 7k | Leaderboard Score |
| | | | | Development Set Scores | | | | | |
| BERT<sub>LARGE</sub> | 92.5 | 89.0 | 91.5 | 86.2 | 70.0 | 92.3 | 62.1 | 90.2 | --- |
| →MNLI | 93.2 | 89.5 | 91.4 | 86.2 | 83.4 | 92.3 | 59.8 | 90.9 | --- |
| →SNLI | 92.7 | 88.5 | 90.8 | 86.1 | 80.1 | --- | 57.0 | 90.7 | --- |
| SpEx-BERT<sub>LARGE</sub> | 93.7 | 88.9 | 91.0 | 86.4 | 69.8 | 91.8 | 64.8 | 89.5 | --- |
| →SQuAD | 93.7 | 86.5 | 90.9 | 86.0 | 74.7 | 91.8 | 57.8 | 90.1 | --- |
| →TriviaQA (Web) | 93.3 | 85.0 | 90.5 | 85.7 | 73.6 | 91.7 | 60.2 | 89.9 | --- |
| →TriviaQA (Wiki) | 94.4 | 86.5 | 90.6 | 85.6 | 71.5 | 91.6 | 59.9 | 90.1 | --- |
| →MNLI | 94.4 | 90.4 | 91.3 | 86.4 | 85.2 | 92.0 | 60.6 | 90.9 | --- |
| →MNLI→SQuAD | 93.7 | 89.5 | 91.1 | 86.4 | 84.1 | 92.3 | 60.5 | 90.2 | --- |
| | | | | Test Set Scores (both on STILTs) | | | | | |
| BERT<sub>LARGE</sub> | 94.3 | 86.6 | 89.4 | 86.0 | 80.1 | 92.7 | 62.1 | 88.5 | 82.0 |
| SpEx-BERT<sub>LARGE</sub> | 94.5 | 87.6 | 89.5 | 86.2 | 79.8 | 92.4 | 63.2 | 89.3 | 82.3 |

FIG. 7

| # Training Examples | SQuAD 87.6k | ZRE 840k | SRL 6.4k | CQA 9.5k |
|---|---|---|---|---|
| SpEx-BERT$_{LARGE}$ | 84.0 | 69.1 | 90.3 | 60.3 |
| → MNLI | 84.5 | 71.6 | 90.7 | 56.7 |
| → ZRE | 84.0 | 69.1 | 90.8 | 61.3 |
| → SQuAD | 84.0 | 82.5 | 91.7 | 63.8 |
| → TriviaQA (Web) | 84.5 | 75.3 | 91.3 | 63.8 |
| → TriviaQA (Wiki) | 84.3 | 74.2 | 91.4 | 64.4 |
| → MNLI → SQuAD | 84.5 | 80.1 | 91.5 | 65.7 |

FIG. 8

| | SST | MRPC | RTE |
|---|---|---|---|
| At most 1k training examples | | | |
| BERT$_{LARGE}$ | 91.1 | 83.8 | 69.0 |
| →MNLI | 90.5 | 85.5 | 82.7 |
| SpEx-BERT$_{LARGE}$ | 91.3 | 82.5 | 67.1 |
| →MNLI | 91.2 | 86.5 | 82.7 |

FIG. 9

| Model | RTE |
|---|---|
| $BERT_{LARGE} \rightarrow RTE$ | 70.0 |
| $BERT_{LARGE} \rightarrow MNLI \rightarrow RTE$ | 83.4 |
| $SpEx\text{-}BERT_{LARGE} \rightarrow RTE$ | 69.8 |
| $SpEx\text{-}BERT_{LARGE} \rightarrow MNLI \rightarrow RTE$ | 85.2 |
| $SpEx\text{-}BERT_{LARGE} \rightarrow \{MNLI, RTE\}$ | 75.0 |
| $SpEx\text{-}BERT_{LARGE} \rightarrow \{MNLI, RTE\} \rightarrow RTE$ | 75.8 |

FIG. 10

| Natural language description | MNLI |
|---|---|
| Proposed Approach | 84.7 |
| - segmentation of input text | 83.2 |
| - terse class descriptions | 84.4 |

FIG. 11

| | SST | MRPC | QQP | MNLI | RTE | QNLI | CoLA | STS | SQuAD | ZRE | SRL | CQA |
|---|---|---|---|---|---|---|---|---|---|---|---|---|
| | | | | | Individual Models | | | | | | | |
| BERT_LARGE | 92.5 | 89.0 | 91.5 | 86.2 | 70.0 | 92.3 | 62.1 | 90.9 | 84.0 | 69.1 | 90.3 | 60.3 |
| SpEx-BERT_LARGE | 93.7 | 88.9 | 91.0 | 86.3 | 69.8 | 91.8 | 64.8 | 89.5 | 84.0 | 69.1 | 90.3 | 60.3 |
| | | | | Multi-task Models (best joint single model) | | | | | | | | |
| SpEx-BERT_LARGE | 92.4 | 87.5 | 90.9 | 85.0 | 71.1 | 91.3 | 58.8 | 89.2 | 80.4 | 75.0 | 97.7 | 61.0 |
| →MNLI | 93.2 | 87.0 | 90.9 | 85.6 | 81.2 | 91.3 | 57.9 | 90.1 | 80.5 | 76.6 | 97.7 | 61.5 |
| →SQuAD | 92.2 | 87.0 | 91.0 | 85.3 | 80.9 | 91.2 | 52.0 | 90.1 | 80.6 | 78.8 | 97.7 | 63.4 |
| →MNLI→SQuAD | 92.3 | 90.9 | 90.8 | 85.2 | 84.1 | 90.9 | 52.1 | 90.2 | 80.6 | 75.3 | 97.8 | 61.5 |
| | | | | Multi-task Models (maximum individual score for each dataset during the course of training) | | | | | | | | |
| SpEx-BERT_LARGE | 93.0 | 88.5 | 91.0 | 85.2 | 73.3 | 91.4 | 59.8 | 88.9 | 81.9 | 77.8 | 97.7 | 64.7 |
| →MNLI | 93.2 | 89.7 | 90.8 | 85.7 | 84.1 | 91.6 | 59.9 | 89.8 | 81.4 | 78.2 | 97.7 | 63.3 |
| →SQuAD | 92.9 | 89.2 | 91.1 | 85.4 | 84.1 | 91.4 | 56.1 | 90.1 | 82.8 | 79.6 | 97.8 | 65.3 |
| →MNLI→SQuAD | 92.7 | 91.4 | 90.8 | 85.4 | 85.2 | 91.2 | 57.5 | 90.2 | 83.2 | 77.5 | 97.8 | 64.8 |

FIG. 12

SYSTEMS AND METHODS FOR UNIFYING QUESTION ANSWERING AND TEXT CLASSIFICATION VIA SPAN EXTRACTION

RELATED APPLICATIONS

This application claims the benefit of U.S. Provisional Application No. 62/835,845 filed Apr. 18, 2019, the disclosure of which are hereby incorporated by reference herein for all purposes.

TECHNICAL FIELD

The present disclosure relates generally to natural language processing (NLP), and more specifically to systems and methods for unifying question answering and text classification via span extraction.

BACKGROUND

Existing NLP systems usually adopt downstream tasks such as text classification, question answering, machine translation, and summarization to process natural language inputs. Such processing approaches via downstream tasks involve a pre-training phase followed by the addition of task-specific layers or modules to implement the downstream task types, and a subsequent re-training or fine-tuning of the conjoined model with the additional task-specific layers. Each task-specific layer relies on an inductive bias related to the kind of target task type. For question answering, a task-specific span-decoder is used to extract a span of text verbatim from a portion of the input text. For text classification, a task-specific classification layer with a fixed number of classes is used instead. The task-specific classification layer is usually built as a separate structure and requires separate training, which may not be resource efficient.

BRIEF DESCRIPTION OF THE DRAWINGS

FIGS. 7-12 are simplified diagrams of the performance results for various NLP systems against various NLP task types.

In the figures, elements having the same designations have the same or similar functions.

DETAILED DESCRIPTION

The typical approach to natural language processing (NLP) task types (e.g., question-answering, classification, sentiment analysis, entailment, regression (e.g., similarity analysis), and/or the like) is to use a set of task-specific decoders to generate the output for the natural language processing module. This results in a more complex neural structure that does not generalize well to other NLP task types.

In view of the need for an efficient implementation of different kinds of NLP task types, embodiments described herein provide systems and methods for reformulating NLP task types that can be treated as text classification tasks as span-extraction problems, and relying on a task-agnostic span-extractive decoder to implement these NLP task types using a unified approach. In this way, no task-specific classification and/or decoder module is needed in the NLP module or NLP system, and processing efficiency of the NLP system can thus be improved.

As used herein, the term "network" may comprise any hardware or software based framework that includes any artificial intelligence network or system, neural network or system and/or any training or learning models implemented thereon or therewith.

As used herein, the term "module" may comprise hardware or software based framework that performs one or more functions. In some embodiments, the module may be implemented using one or more neural networks.

Figure 1:
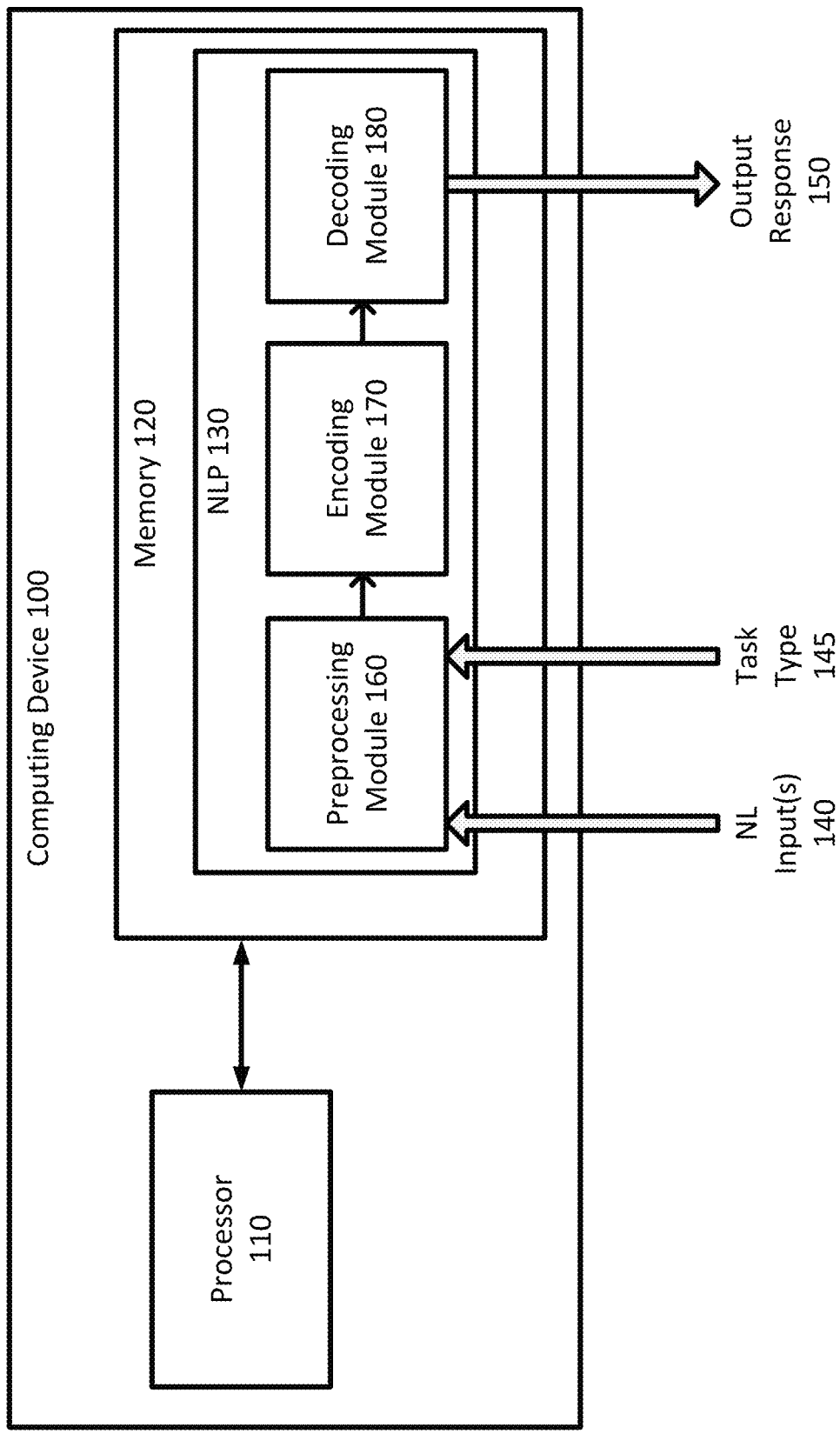
FIG. 1 is a simplified diagram of a computing device implementing a NLP system, according to some embodiments.

FIG. 1 is a simplified diagram of a computing device 100 for implementing an NLP system according to some embodiments. As shown in FIG. 1, computing device 100 includes a processor 110 coupled to memory 120. Operation of computing device 100 is controlled by processor 110. And although computing device 100 is shown with only one processor 110, it is understood that processor 110 may be representative of one or more central processing units, multi-core processors, microprocessors, microcontrollers, digital signal processors, field programmable gate arrays (FPGAs), application specific integrated circuits (ASICs), graphics processing units (GPUs), tensor processing units (TPUs), and/or the like in computing device 100. Computing device 100 may be implemented as a stand-alone subsystem, as a board added to a computing device, and/or as a virtual machine.

Memory 120 may be used to store software executed by computing device 100 and/or one or more data structures used during operation of computing device 100. Memory 120 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 110 and/or memory 120 may be arranged in any suitable physical arrangement. In some embodiments, processor 110 and/or memory 120 may be implemented on a same board, in a same package (e.g., system-in-package), on a same chip (e.g., system-on-chip), and/or the like. In some embodiments, processor 110 and/or memory 120 may include distributed, virtualized, and/or containerized computing resources. Consistent with such embodiments, processor 110 and/or memory 120 may be located in one or more data centers and/or cloud computing facilities.

In some examples, memory 120 may include non-transitory, tangible, machine readable media that includes executable code that when run by one or more processors (e.g., processor 110) may cause the one or more processors to perform the methods described in further detail herein. For example, as shown, memory 120 includes a task-agnostic NLP module 130 that may be used to implement and/or emulate the systems and models, and/or to implement any of the methods described further herein. In some examples, NLP module 130 may be used to process one or more natural language inputs 140 (e.g., text) according to a task type 145 and generate an output response 150 corresponding to a span of text that represents the result of the NLP processing by NLP module 130. In some examples, output response 150 may correspond to a start and an end tokens for the span of text from the one or more natural language inputs 140 as is described in further detail below. In some examples, task type 145 may be any of the NLP tasks of question-answering, classification, sentiment analysis, entailment, regression (e.g., similarity analysis), and/or the like. In some examples, NLP module 130 may also handle the iterative training and/or evaluation of a system, module, or model used for NLP tasks.

In some embodiments, NLP module 130 includes a preprocessing module 160, an encoding module 170, and a decoding module 180, which may be serially connected or connected in other manners. In some examples, NLP module 130 and the sub-modules 160-180 may be implemented using hardware, software, and/or a combination of hardware and software.

According to some embodiments, NLP module 130 is configured to treat each of the supported NLP task types indicated by task type 145 as span-extractive tasks using task-agnostic decoding module 180. Thus, preprocessing module 160 is configured to take the one or more natural language inputs 140 and organize them according to task type 145 into a source text which contains the span to be extracted for output response 150 and an auxiliary text that is used to help extract the span as is described in further detail below.

Encoding module 170 is configured to extract features from the preprocessed input from preprocessing module 160, e.g., by generating vector representations of the text in the source text and the auxiliary text. In some examples, encoding module 170 builds representations of the source and/or auxiliary text in relatively task-agnostic ways, e.g., independent of the NLP task type identified by task type 145. In some examples, encoding module 170 may include one or more neural networks, such as one or more long short-term memories (LSTMs), transformers, convolutional neural networks, attention networks, pooling networks, and/or the like.

Decoding module 180 is a span-extractive decoder that uses the extracted features output by encoding module 170 to select a start and end token within the source text as is described in further detail below.

Figure 2:
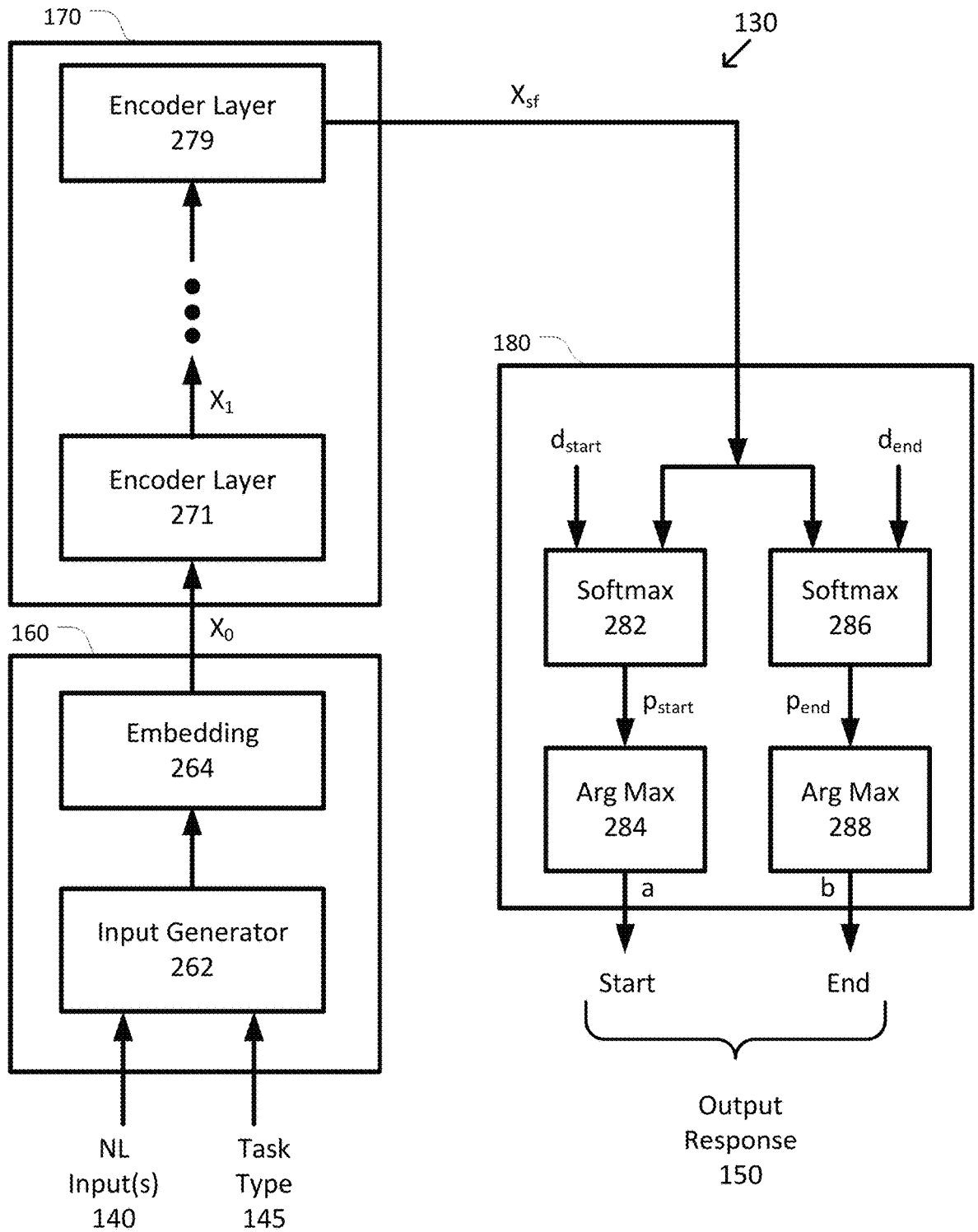
FIG. 2 is a simplified diagram of an exemplary implementation of an NLP module according to some embodiments.

FIG. 2 is a simplified diagram of an exemplary implementation of NLP module 130 according to some embodiments. Consistent with FIG. 1, FIG. 2 shows that NLP module 130 includes preprocessing module 160, encoding module 170, and decoding module 180.

As shown in FIG. 2, preprocessing module 160 includes an input generator 262 and an embedding module 264. Input generator 262 receives the one or more natural language inputs 140 and task type 145 and generates a combined natural language text string that includes the source text and the auxiliary text. The source text and the auxiliary text are generated according to task type 145. In some examples, the source text includes m tokens (e.g., words, numbers, etc.) and the auxiliary text includes n tokens. In some examples, the combined natural language string is prepended with a special beginning of text token (CLS). In some examples, the source text and the auxiliary text are separated in the combined natural language string with a special separator token (SEP).

In some examples, when task type 145 corresponds to a natural language question-answering task, the auxiliary text, which is supplied as one of the one or more natural language inputs 140, corresponds to the question and the source text, which is supplied as one of the one or more natural language inputs 140, corresponds to the context.

In some examples, when task type 145 corresponds to a natural language classification task, the auxiliary text, which is supplied as one of the one or more natural language inputs 140, corresponds to the sentence that is the subject of the classification and the source text includes at least a list of classifications for the sentence. In some examples, the list of classifications may be supplied as one of the one or more natural language inputs 140. In some examples, the list of classification may be selected from a standard list of entailment classes known to preprocessing module 160, such as may be extracted from a table, a database, and/or the like based on task type 145.

In some examples, variations of the natural language classification task may include a natural language sentiment task, a natural language entailment task, a natural language regression task, and/or the like. In some examples, for the natural language sentiment task the source text may optionally include some framing text and/or punctuation (e.g., a question mark ?). In some examples, for the natural language entailment task, the source text further includes a second statement to be evaluated to determine whether it entails or not from the auxiliary text. The second statement is supplied as one of the one or more natural language inputs 140. In some examples, for natural language regression, the source text includes a list of similarity options, such as list of floating point numbers (e.g., "0.0, 0.2, 0.4, 0.6, 0.8, or 1.0" and/or the like) as the list of classifications as well as a second statement to be evaluated to determine its semantic similarity to the auxiliary text. The second statement is supplied as one of the one or more natural language inputs 140.

Figures 3A, 3B:
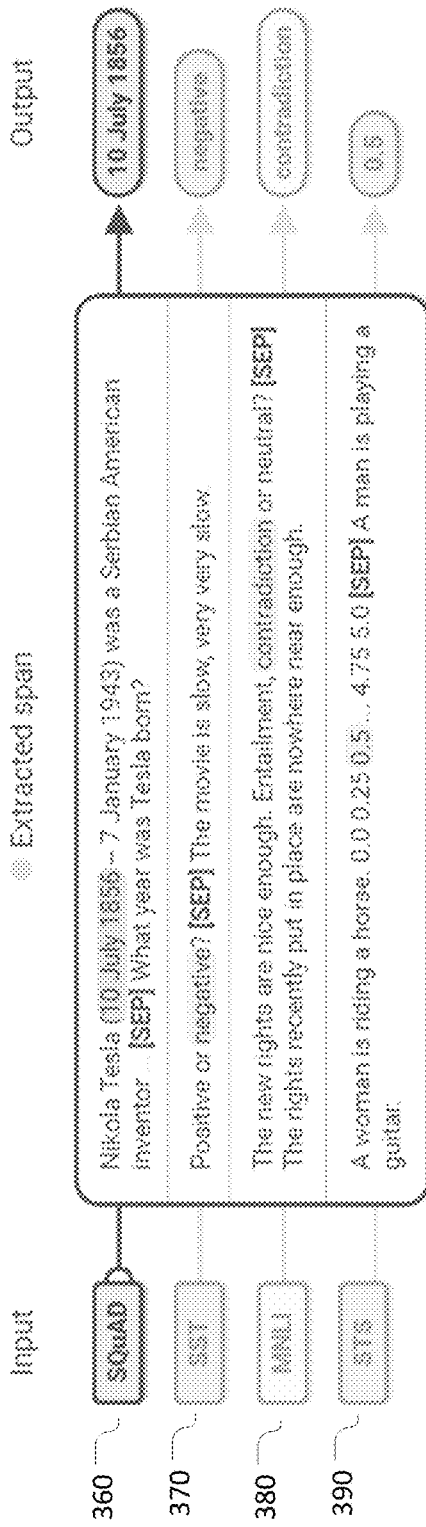
FIGS. 3A and 3B are simplified diagrams of exemplary NLP tasks according to some embodiments.

Examples of how the one or more natural language inputs 140 are converted to the source text, the auxiliary text, and the combined natural language string are shown in FIGS. 3A and 3B, which are simplified diagrams of exemplary NLP tasks according to some embodiments.

Example 310 of FIG. 3A shows an example of a natural language classification task for evaluating the sentiment of a sentence. Example 310 is representative of examples found in the Stanford Sentiment Treebank (SST) dataset. The SST dataset is described in further detail in Socher, et al., "Recursive Deep Models for Semantic Compositionality over a Sentiment Treebank," Proceedings of the 2013 Conference on Empirical Methods in Natural Language Processing, pages 1631-1642, which is incorporated by reference herein. Also shown in bold in example 310 is the ground truth span within the source text that represents the ground truth classification of the auxiliary text as "negative", which may additionally be used when example 310 is used to train NLP module 130. A variation of example 310 is shown in example 370 of FIG. 3B, which also shows the use of the separator token (SEP) between the source text and the auxiliary text.

Example 320 of FIG. 3A shows an example of a natural language entailment task as a variation of a natural language classification task. Example 320 is representative of examples found in the Multi-genre Natural Language Inference (MNLI) dataset. The MNLI dataset is described in further detail in Williams, et al., "A Broad-Coverage Challenge Corpus for Sentence Understanding through Inference," available at https://arxiv.org/abs/1704.05426, which is incorporated by reference herein. Also shown in bold in example 320 is the ground truth span within the source text that represents the ground truth entailment conclusion of "contradiction", which may additionally be used when example 320 is used to train NLP module 130. Another example of an entailment task from the MNLI is shown as example 380 of FIG. 3B.

Example 330 of FIG. 3A shows another example of a natural language entailment task as a variation of a natural language classification task. Example 330 is representative of examples found in the Recognizing Textual Entailment (RTE) dataset. The RET dataset is described in further detail in Dagan, et al., "Recognizing Textual Entailment: Rational, Evaluation and Approaches—erratum," Natural Language Engineering, 16(1), pages 105-105; Bar-Haim, et al., "The Second PASCAL Recognising Textual Entailment Challenge," Proceedings of the Second PASCAL Challenges Workshop on Recognizing Textual Entailment, 1006, volume 6, pages 6-4; Giampiccolo, et al., "The Third PASCAL Recognizing Textual Entailment Challenge," Proceedings of the ACL-PASCAL Workshop on Textual Entailment and Paraphrasing, 2007; and Bentivogli, et al. "The Fifth PASCAL Recognizing Textual Entailment Challenge," 2009 Text Analysis Conference, each of which is incorporated by reference herein. As shown, example 330 includes different entailment classification options than example 320 indicating that different types of entailment task types may include a different set of supplied and/or looked-up entailment classifications. Also shown in bold in example 330 is the ground truth span within the source text that represents the ground truth entailment conclusion of "not", which may additionally be used when example 330 is used to train NLP module 130.

Example 340 of FIG. 3A shows an example of a natural language regression task as a variation of a natural language classification task. Example 340 is representative of examples found in the Semantic Textual Similarity (STS-B) dataset. The STS-B dataset is described in further detail in Cer, et a. "SemEval-2017 Task 1: Semantic Textual Similarity—Multilingual and Cross-lingual Focused Evaluation," 2017 Proceedings of the SemEval Workshop of the Association for Computational Linguistics, which is incorporated by reference herein. As shown, example 340 includes a list of similarly options "0.0 0.25 0.5 0.75 1.0 . . . 5.0." Also shown in bold in example 340 is the ground truth span within the source text that represents the ground truth regression conclusion of "0.5", which may additionally be used when example 340 is used to train NLP module 130. Another example of a regression task from the STS-B is shown as example 390 of FIG. 3B.

Example 350 of FIG. 3A shows an example of a natural language question-answering task for determining an answer to a question based on a context. Example 340 is representative of examples found in the Stanford Question Answering Dataset (SQuAD). SQuAD is described in further detail in Rajpurkar, et al., "SQuAD: 100,000+ Questions for Machine Comprehension of Text.," Proceedings of the 2016 Conference on Empirical Methods in Natural Language Processing (EMNLP), which is incorporated by reference herein. Also shown in bold in example 340 is the ground truth span within the source text that represents the answer of "10 Jul. 1856" to the question in the auxiliary text, which may additionally be used when example 340 is used to train NLP module 130. A variation of example 350 is shown in example 360 of FIG. 3B, which also shows the use of the separator token between the source text and the auxiliary text.

Referring back to FIG. 2, embedding module 264 of preprocessing module 160 converts each of the tokens in the combined natural language text string into a vector value from $\mathbb{R}^d$ that includes a combination of a token embedding and a positional embedding. In some examples, the token embedding and the positional embedding are added together. In some examples, the vector value may further include an embedding that represents whether the token is from the source text or the auxiliary text portion of the combined natural language text string. In some examples, the embeddings may be consistent with one or more of GLoVE embeddings, character n-gram embeddings, and/or the like. The embeddings of each of the tokens in the combined natural language text string are then stacked into a matrix $X_0 \in \mathbb{R}^{p \times d}$, where p is the number of tokens in the natural language text string. In some examples, p=m+n when neither the CLS or SEP tokens are added to the combined natural language text string by input generator 262, and p is incremented by one for each of the CLS and/or SEP tokens that are added to the combined natural language text string by input generator 262.

As further shown in FIG. 2, encoding module 170 includes a plurality of encoder layers 271-279 for encoding the natural language text string in the embedded form provided as $X_0$ by embedding module 264 to extract features from the combined natural language text string. As shown, encoder layer 271 processes $X_0$ to generate $X_1$, which is further encoded by a second encoder layer (not shown) until a last encoder layer 279 generates an output encoding $X_{sf}$. In some examples, any number of encoding layers 271-279 are possible including one, two, three, etc. including as many as 12, 24, and/or the like. In some examples, encoding module 170 is an attention-based encoding module using attention networks as are described in further detail in Devlin, et al.," BERT: Pre-training of Deep Bidirectional Transformers for Language Understanding," available at https://arxiv.org/abs/1810.04805 and Vaswani, et al., "Attention is All You Need," available at https://arxiv.org/abs/1706.03762, each of which is hereby incorporated by reference in its entirety.

Figure 4:
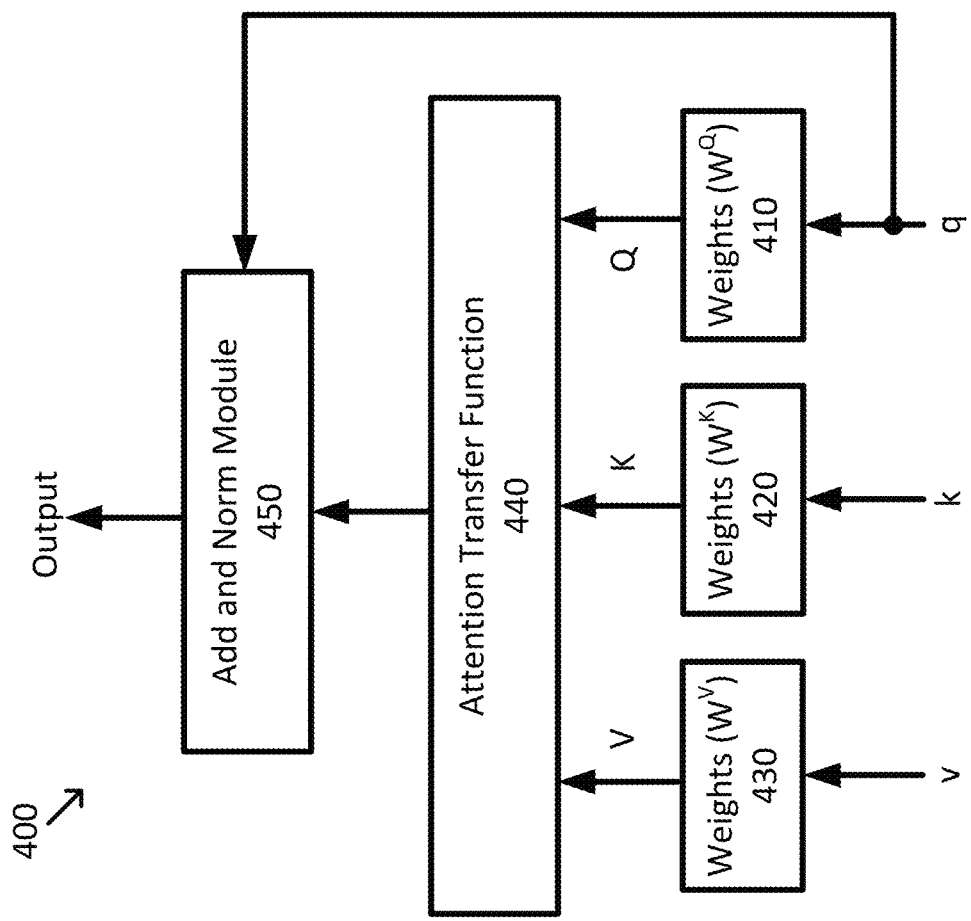
FIG. 4 is a simplified diagram of an attention network according to some embodiments.

FIG. 4 is a simplified diagram of an attention network 400 according to some embodiments. As shown in FIG. 4, attention network 400 receives a query $q \in \mathbb{R}^{d_q}$, a key $k \in \mathbb{R}^{d_k}$, and a value $v \in \mathbb{R}^{d_k}$. Each of the q, k, and v are subject to respective weights $W^Q$ 410, $W^K$ 420, and $W^V$ 430 according to Equation 1. The weights $W^Q$ 410, $W^K$ 420, and $W^V$ 430 are altered during training using back propagation.

$$Q = qW^Q \in \mathbb{R}^{d_q}$$

$$K = kW^K \in \mathbb{R}^{d_k}$$

$$V = vW^V \in \mathbb{R}^{d_v} \qquad \text{Equation 1}$$

The resulting Q, K, and V vectors are passed through an attention transfer function 440, which generates a dot product of Q and K, which is then applied to V according to Equation 2.

$$\text{Attention}(Q, K, V) = \left(\frac{QK^T}{\sqrt{d_k}}\right) V \in \mathbb{R}^{d_v} \qquad \text{Equation 2}$$

An addition and normalization module 450 is then used to combine the query q with the output from the attention transfer function to provide a residual connection that improves the rate of learning by attention network 400.

Addition and normalization module 450 implements Equation 3 where μ and σ are the mean and standard deviation, respectively, of the input vector and $g_i$ is gain parameter for scaling the layer normalization. The output from addition and normalization module 450 is the output of attention network 400.

$$LayerNorm(\text{Attention}(Q, K, V) + q)$$
$$LayerNorm(a_i) = g_i \frac{a_i - \mu}{\sigma} \quad \text{Equation 3}$$

Attention network 400 is often used in two variant forms. The first variant form is a multi-head attention network where multiple attention networks consistent with attention network 400 are implemented in parallel, which each of the "heads" in the multi-head attention network having its own weights $W^Q$ 410, $W^K$ 420, and $W^V$ 430, which are initialized to different values and thus trained to learn different encodings. The outputs from each of the heads are then concatenated together to form the output of the multi-head attention network. The second variant form is a self-attention network that is a multi-head attention network where the q, k, and v inputs are the same for each head of the attention network.

Figure 5:
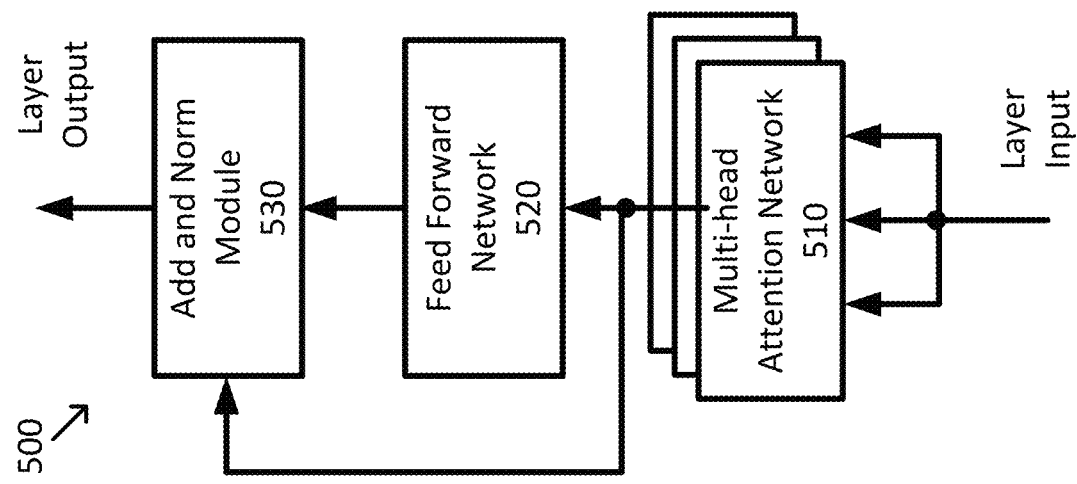
FIG. 5 is a simplified diagram of an attention-based encoder layer according to some embodiments.

FIG. 5 is a simplified diagram of an attention-based encoder layer 500 according to some embodiments. As shown in FIG. 5, attention-based encoder layer 500 receives layer input (e.g., any of the $X_i$ encodings) and provides it to all three (q, k, and v) inputs of a multi-head attention network 510, thus multi-head attention network 510 is configured as a self-attention network. Each head of multi-head attention network 510 is consistent with attention network 400. In some examples, multi-head attention network 510 includes eight heads, however, other numbers of heads such as two, three, four, five, six, seven, and/or more than eight heads are possible. The output of multi-head attention network 510 is provided to a feed forward network 520 with both the input and output of feed forward network 520 being provided to an addition and normalization module 530, which generates the layer output for attention-based encoder layer 500. In some examples, feed forward network 520 is a two-layer perceptron network with a rectified linear unit (ReLU) activation, which implements Equation 4 where γ is the input to feed forward network 520 and $M_i$ and $b_i$ are the weights and biases respectively of each of the layers in the perceptron network. In some examples, addition and normalization module 530 is substantially similar to addition and normalization module 450.

$$FF(\gamma) = \max(0, \gamma M_1 + b_1) M_2 + b_2 \quad \text{Equation 4}$$

Referring back to FIG. 2, in some embodiments, each of encoder layers 271-279 is consistent with attention-based encoder layer 500. In some examples, encoding module 170 in a pre-trained BERT encoder as is described in Devlin, et al.," BERT: Pre-training of Deep Bidirectional Transformers for Language Understanding," available at https://arxiv.org/abs/1810.04805.

As further shown in FIG. 2, the output $X_{sf}$ of encoding module 170 is passed to decoding module 180. In some examples, only the tokens in $X_{sf}$ corresponding to the m positions of the source text are passed to decoding module 180. Decoding module 180 further includes two trainable parameter vectors $d_{start}$ and $d_{end}$, which are used to identify the start and ending positions of the span within the source text from which output response 150 is generated. The vector $d_{start}$ and $X_{sf}$ are passed to a softmax module 282, which generates, according to Equation 5, a distribution of possible starting tokens $p_{start}$ for the span to be identified within the source text. Similarly, vector $d_{end}$ and $X_{sf}$ are passed to a softmax module 286, which generates, according to Equation 6, a distribution of possible ending tokens $p_{end}$ for the span to be identified within the source text.

$$p_{start} = \text{softmax}(X_{sf} d_{start}) \quad \text{Equation 5}$$
$$p_{end} = \text{softmax}(X_{sf} d_{end}) \quad \text{Equation 6}$$

During training, decoding module 180 may be trained using a summation of cross-entropy losses between the distribution of starting indexes $p_{start}$ and the ground truth starting index a* and between the distribution of ending indexes $p_{end}$ and the ground truth ending index b* according to Equation 7. In some examples, decoding module 180 may be trained using a supervised learning algorithm such as back propagation, stochastic gradient descent, and/or the like.

$$\mathcal{L} = -\Sigma_i I\{a^* = i\} \log p_{start}(i) - \Sigma_i I\{b^* = i\} \log p_{end}(i) \quad \text{Equation 7}$$

When decoding module 180 is used during inferencing, the distribution of starting indexes $p_{start}$ is passed to an argument maximum (arg max) module 284, which selects the index with the highest distribution value in $p_{start}$ as the starting index a according to Equation 8. Similarly, the distribution of ending indexes $p_{end}$ is passed to an argument maximum module 288, which selects the index with the highest distribution value in $p_{end}$ as the ending index b according to Equation 9. Collectively a and b correspond to the start and end of the span within the source text that corresponds to output response 150.

$$a = \underset{i}{\arg\max}(p_{start}(i)) \quad \text{Equation 8}$$
$$b = \underset{i}{\arg\max}(p_{end}(i)) \quad \text{Equation 9}$$

Figure 6:
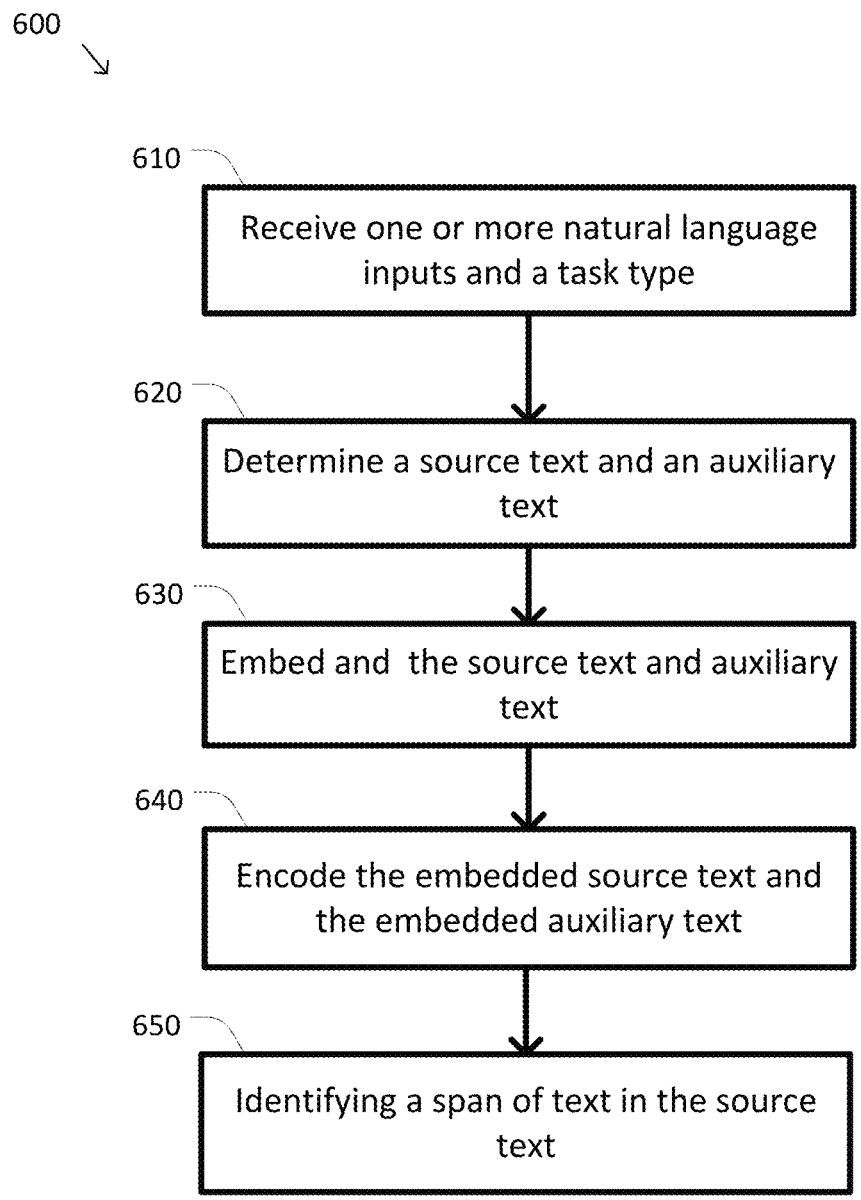
FIG. 6 is a simplified diagram of a method for processing different NLP tasks according to some embodiments.

FIG. 6 is a simplified diagram of a method 600 for processing different NLP tasks according to some embodiments. One or more of the processes 610-650 of method 600 may be implemented, at least in part, in the form of executable code stored on non-transitory, tangible, machine-readable media that when run by one or more processors may cause the one or more processors to perform one or more of the processes 610-650. In some embodiments, method 600 may correspond to the method used by NLP module 130 to perform different NLP tasks using span extraction.

At a process 610, one or more natural language inputs and a task type are received. In some examples, the one or more natural language inputs may be the one or more natural language inputs 140 and the task type may be task type 145. In some examples, the one or more natural language inputs and/or the task type may be consistent with the examples discussed with respect to FIGS. 3A and 3B. In some examples, the one or more natural language inputs and/or the task type may be received as parameters to one or more application programming interface (API) calls for accessing a natural language processing module, such as NLP module 130.

At a process 620, a source text and an auxiliary text are determined from the one or more natural language inputs and the task type received during process 610. In some examples, the auxiliary text may be one of the one or more natural language inputs. In some examples, the source text may be another of the one or more natural language inputs, such as when the task type is a question-answering task. In some examples, a portion of the source text may be another of the one or more natural language inputs, such as when the task type is a natural language entailment task and the another of the one or more natural language inputs is the second statement to be used in the entailment analysis. In some examples, the source text may include a list of classifications (e.g., when the task type is a natural language classification task, a natural language sentiment task, a natural language entailment task, and/or the like) and/or similarity options (e.g., when the task type is a natural language regression task). In some examples, the list of classification and/or similarity options may be one of the one or more natural language inputs. In some examples, the list of classification and/or similarity options may be looked up in a table, a database, and/or the like based on the task type. In some examples, the source text may include some framing text and/or punctuation. In some examples, the source text and the auxiliary text may also be converted to a combined text string. In some examples, the combined text string may include a CLS and/or a SEP token. In some examples, the source text and the auxiliary text may be consistent with the examples of FIGS. 3A and 3B. In some examples, the source text and the auxiliary text may be determined by an input generator of a preprocessing module, such as input generate 262.

At a process 630, the source text and the auxiliary text are embedded. In some examples, an embedding module (e.g., embedding module 264) converts each of the tokens in the source text and the auxiliary text (e.g., the combined natural language text string) into a vector value from $\mathbb{R}^d$ that includes a combination of a token embedding and a positional embedding. In some examples, the token embedding and the positional embedding are added together. In some examples, the vector value may further include an embedding that represents whether the token is from the source text or the auxiliary text portion of the combined natural language text string.

At a process 640, the embedded source text and the embedded auxiliary text are encoded. The encoding extracts features from the source text and the auxiliary text that are relevant to the natural language task identified by the task type. In some examples, the encoding may be performed by one or more neural networks, such as one or more LSTMs, transformers, convolutional neural networks, attention networks, pooling networks, and/or the like. In some examples, the encoding may be performed using a multi-layer attention-based encoder, such as the example encoding module 170 described with respect to FIG. 2.

At a process 650, a span of text is identified in the source text. In some examples, the span of text corresponds to the result of the natural language task being performed. In some examples, the span of text is consistent with output response 150 and/or the examples from FIGS. 3A and 3B. In some examples, the span of text is identified by a start token and an end token within the source text that indicates the portion of the source text that is the result of the natural language task. In some examples, the span of text may be extracted using a span-extractive decoder, such as the example of decoding module 180 described with respect to FIG. 2.

NLP module 130 and method 600 show promising performance against broad categories of natural language question-answering and natural language classification (including natural language entailment, and natural language regression) tasks. The natural language classification tasks include those based on GLUE as described in Wang, et al. "GLUE: A Multi-task Benchmark and Analysis Platform for Natural Language Understanding, 2019 International Conference on Learning Representations (ICLR); SST; the MSR Paraphrase Corpus (MRPC) as describe in Dolan, et al. "Automatically Constructing a Corpus of Sentential Paraphrases," Proceedings of the Third International Workshop on Paraphrasing, 2005; Quora Question Pairs (QQP); MNLI; RTE; and Question-answering as Natural Language Inference (QNLI) as described in Rajpurkar, et al., "SQuAD: 100,000+ Questions for Machine Comprehension of Text.," Proceedings of the 2016 Conference on EMNLP, each of which is hereby incorporated by reference in its entirety.

The natural language question-answering tasks include those based on SQuAD; QA Zero-shot Relationship Extraction (ZRE) as described in Levy, et al., "Zero-shot Relation Extraction via Reading Comprehension," available at https://arxiv.org/abs/1706.04115; QA Semantic Role Labeling (SRL) as described in He, et al., "Question-answer Driven Semantic Role Labeling: Using Natural Language to Annotate Natural Language," 2015 Conference on Empirical Methods in Natural Language Processing; Commonsense Question Answering (CQA) as described in Talmor, et al., 2019 North American Chapter of the Association for Computational Linguistics Conference; and the two versions (Web and Wiki) of the TriviaQA as described in Joshi, et al., "TriviaQA: A Large Scale Distantly Supervised Challenge Dataset for Reading Comprehension," available at https://arxiv.org/abs/1705.03551, each of which is hereby incorporated by reference in its entirety.

According to some embodiments, NLP module 130 of FIG. 2 is trained similarly to the setup of the original BERT formulation as described in Devlin, et al.," BERT: Pre-training of Deep Bidirectional Transformers for Language Understanding," available at https://arxiv.org/abs/1810.04805 and Phang, et al., "Sentence Encoders on STILTs: Supplementary Training on Intermediate Labeled-data Tasks," available at https://arxiv.org/abs/1811.01088, each of which is hereby incorporated by reference in its entirety. In some examples, the 12-layer (e.g., the number of encoder layers) BERT model is referred to as BERT-BASE and the 24-layer BERT model is referred to as BERT-LARGE. In some examples, each of the NLP modules 130 of FIG. 2 are trained using a batch size of 20 for 5 epochs. In some examples, when using the SQuAD and QQP datasets, NLP module 130 of FIG. 2 is trained for 2 epochs with a larger initial learning rate. In some examples, no significant hyperparameter tuning occurred. In some examples based on STILTs, the Adam optimizer is reinitialized. In some examples, for smaller datasets, BERT (especially BERT-LARGE) is known to have instability and, in such cases, the best score from 50 experiments is reported.

FIGS. 7-12 are simplified diagrams of the performance results for various NLP systems against various NLP task types. In the examples of FIGS. 7-12, entries rendered in bold are the best performance for the respective task type. In the examples of FIGS. 7-12, NLP module 130 of FIG. 2 is referred to as Span-extraction BERT (SpEx-BERT). As FIGS. 7-12 show: (a) span-extraction is an effective approach for unifying machine comprehension and text classification—even without any architectural modifications across datasets or natural language task types; (b) posing the problems as span-extraction yields performance benefits in most cases; c) span-extraction retains gains obtained via intermediate-task training on text classification; d) intermediate-task training may be extended to span-extractive question answering; e) a combination of natural language question answering and natural language classification datasets may outperform using only one kind of dataset during intermediate-task training with span-extraction; f) multi-task learning may yield improvements of single-task learning, but these improvements are lesser than intermediate-task training with span-extraction; and g) span-extraction is more robust in the presence of limited training data.

SpEx-BERT has similar or superior performance on natural language classification tasks as other approaches using task-specific decoder modules. FIG. 7 shows results comparing BERT (both with and without STILTs) with the corresponding variant of SpEx-BERT on the classification subset of the GLUE tasks. For almost all datasets, the performance for SpEx-BERT is better than that of BERT for either sizes of the model (BASE, with 12 layers or LARGE, with 24 layers). In some examples, it is likely that model performance may improve by converting an n-way classification problem into a span-extraction problem over natural language class descriptions.

As FIG. 7 further shows, the use of STILTs also improves SpEx-BERT. In some examples, the modules using STILTs include a two-stage training process. In the first stage, the BERT model is fine-tuned with a span-extraction head on an intermediate task type, typically one for which large amounts of training data are available and is similar to the target task type in some respect. In the second stage, the module is fine-tuned on the target task type with a fresh instance of the optimizer. In the BERT module using STILTs, a new classifier head is required when moving from one task (e.g., ternary classification of entailment on MNLI) to another (e.g., binary classification on SST). However, no such modifications are necessary when SpEx-BERT is applied. Further, the SpEx-BERT module may switch between natural language question-answering task types and various natural language classification task types without have to change the module or use additional and/or different decoder modules.

FIG. 12 shows the performance results for SpEx-BERT on STILTs on both BASE and LARGE models. The performance results in FIG. 12 are for a single (joint) NLP module obtained by multi-tasking on all included datasets. The best single-task performances (without STILTs) are labeled as individual models for comparison to the other performance results. The remaining performance results are divided into two parts—in the first, the performance results indicate the performance on a single snapshot during training and not individual maximum scores across the training trajectory. In the second, the best performance result for every dataset through the training; note that this involves inference on multiple snapshots. For the models trained with STILTs, the SpEx-BERT module is first fine-tuned on the intermediate task by itself after which the SpEx-BERT module is trained in multi-tasking fashion. Again, in a majority of the cases, the performance of SpEx-BERT matches or outperforms that of BERT. This is especially true for datasets with limited training data, such as MRPC and RTE, the performance gain is relatively higher (85.2 vs. 83.4 for RTE with BERT LARGE and 90.4 vs 89.5 for MRPC). In some examples, the increased performance of SpEx-BERT, especially on smaller datasets, is because the list of classifications is provided to the model in natural language form instead of being provided as categorical labels. This better utilizes the pre-trained representations of a large natural language model like BERT. In some examples, the question answering datasets (SQuAD and TriviaQA) improve performance of some of the GLUE tasks. Notable examples include SST (pre-trained from TriviaQA-Wiki) and RTE (pre-trained from any of the three datasets).

As shown in FIG. 8, using STILTs also improves question answeringQAZ. The transferability of question answering datasets is well-known. Datasets such as TriviaQA, SQuAD and ZRE have been known to improve each other's scores and have improved robustness to certain kinds of queries. In addition, when using the formulation of SpEx-BERT, classification datasets also help question-answering datasets by a significant amount. In particular, MNLI improves the scores of almost all datasets over their baselines. In the specific case of SQuAD, the benefit of STILTs with MNLI is almost as much as the TriviaQA dataset. In some examples, STILTs with larger chain lengths may also be effective. Pre-training approaches using intermediate task types with labeled data has been shown to be useful in improving performance. FIG. 8 shows the impact of using larger chain lengths. Conceptually, if improved performance on SQuAD during the first stage of fine-tuning leads to improved performance for the target task of CQA, improving performance of SQuAD through in turn pre-training it on MNLI would improve the eventual goal of CQA. FIG. 8 suggests the efficacy of this recursive approach. CQA obtains a performance result of 63.8 when fine-tuned from a SQuAD model (of performance result 84.0) and obtains a performance result of 65.7 when fine-tuned on a SQuAD model fine-tuned from MNLI (of performance result 84.5).

FIG. 10 shows that multitasking improves performance of SpEx-BERT but is inferior to using STILTs. In some examples, multitasking with the various task objectives instead of using intermediate tasks solely for pre-training is also considered. FIG. 10 shows the results of this approach the RTE dataset. In the results of FIG. 10, one batch for each of the tasks is cycled through until a maximum number of iterations is reached. As FIG. 10 shows, the use of multi-tasking still improves the performance over the baseline, but the performance gain is less than using MNLI as an intermediate task in STILTs. This is true even if RTE and MNLI are multitasked upon in the intermediate stage. However, as an added benefit, the approach of multitasking on RTE and MNLI allows for a natural language processing module that performs well on two datasets rather than just RTE. As FIG. 8 further shows, performance of the joint (single) model is: 75.0 for RTE and 86.2 for MNLI, both of which are better than their single-task baselines.

FIG. 9 shows that using STILTs with SpEx-BERT is more robust with limited training data. The results of FIG. 9 correspond to fine-tuning the respective BERT and SpEx-BERT modules with sub-sampled versions of the dataset. As shown in the results of FIG. 9, 1000 data points are sub-sampled at random without replacement and the best development set accuracy is chosen across several random restarts. As shown in FIG. 9, performance of SpEx-BERT is comparable to that of BERT in the limited-data setting. When used in conjunction with STILTs, the performance improves as expected and, in a majority of cases, significantly exceeds that of the corresponding BERT baseline that does not use span-extraction.

According to some embodiments, simpler (e.g., shorter text samples) are better. In some examples, being as terse as possible eases training because the softmax operation over possible start and end locations is over a smaller window. FIG. 11 shows the effects of various levels of brevity when preparing the text using preprocessing module 160 for the MNLI dataset with BERT Base.

As is described previously, SpEx-BERT allows for a single task-agnostic decoder module to be used across a broader set of task types. In some embodiments, this makes possible a single, joint module with shared parameters rather than separate modules with different parameters for different task types. As shown in FIG. 12, multi-task performance exceeds single-task performance for many of the question answering datasets (ZRE, SRL, CQA) as well as the RTE classification datasets RTE. In some examples, these improvements are drastic (more than 9% accuracy).

Some examples of computing devices, such as computing device 100 may include non-transitory, tangible, machine readable media that include executable code that when run by one or more processors (e.g., processor 110) may cause the one or more processors to perform the processes of method 600 and/or emulate the structures of FIGS. 2, 4, and 5. Some common forms of machine readable media that may include the processes of method 600 and the emulations of FIGS. 2, 4, and 5 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A system for performing a natural language processing (NLP) task comprising:
   a preprocessor for preparing a source text and an auxiliary text based on a task type of the NLP task, the task type being entailment, classification, or regression, and including a list of classifications in the source text when the task type is entailment or classification;
   an encoder for receiving the source text and the auxiliary text from the preprocessor and generating an encoded representation of a combination of the source text and the auxiliary text; and
   a span-extractive decoder for receiving the encoded representation and identifying a span of text within the source text that is a result of the NLP task.

2. The system of claim 1, wherein the encoder is a multi-layer attention-based encoder.

3. The system of claim 1, wherein the span-extractive decoder comprises:
   a first softmax for combining a trainable parameter vector associated with start token positions of the span of text and a portion of the encoded representation corresponding to the source text and generating a distribution of possible start tokens for the span of text;
   a first argument maximum module for selecting a start token for the span of text based on the distribution of possible start tokens for the span of text;
   a second softmax for combining a trainable parameter vector associated with end token positions of the span of text and the portion of the encoded representation corresponding to the source text and generating a distribution of possible end tokens for the span of text; and
   a second argument maximum module for selecting an end token for the span of text based on the distribution of possible end tokens for the span of text.

4. The system of claim 1, wherein the preprocessor further:
   receives one or more text inputs; and
   uses one of the one or more text inputs as the auxiliary text.

5. The system of claim 4, wherein the preprocessor further uses another of the one or more text inputs as part of the source text when the task type is entailment or regression.

6. The system of claim 1, wherein the list of classifications is included in one of the one or more text inputs.

7. The system of claim 1, wherein the list of classifications is looked-up based on the task type.

8. The system of claim 1, wherein the preprocessor further includes a list of similarity options in the source text when the task type is regression.

9. The system of claim 1, wherein the preprocessor further generates an embedding for the combination of the start text and the auxiliary text, the embedding including information as to whether an embedded token corresponds to a token in the start text or a token in the auxiliary text.

10. A method for performing an natural language processing (NLP) task comprising:
    preparing, using a preprocessing module, a source text and an auxiliary text based on a task type of the NLP task, the task type being entailment, classification, or regression by including a list of similarity options in the source text when the task type is regression;
    generating, using an encoding module, an encoded representation of a combination of the source text and the auxiliary text; and
    identifying, using a span-extractive decoding module, a span of text within the source text that is a result of the NLP task.

11. The method of claim 10, wherein generating the encoded representation comprises using a plurality of attention-based encoding layers.

12. The method of claim 10, wherein identifying the span of text comprises:
   combining a trainable parameter vector associated with start token positions of the span of text and a portion of the encoded representation corresponding to the source text to generate a distribution of possible start tokens for the span of text;
   selecting a start token for the span of text based on the distribution of possible start tokens for the span of text;
   combining a trainable parameter vector associated with end token positions of the span of text and the portion of the encoded representation corresponding to the source text and generating a distribution of possible end tokens for the span of text; and
   selecting an end token for the span of text based on the distribution of possible end tokens for the span of text.

13. The method of claim 10, wherein preparing the auxiliary text comprises receiving the auxiliary text as an input.

14. The method of claim 10, wherein preparing the source text comprises receiving a portion of the source text as an input when the task type is entailment or regression.

15. The method of claim 10, wherein preparing the source text comprises including a list of classifications in the source text when the task type is entailment or classification, the list of classifications being received as an input or being looked-up based on the task type.

16. The method of claim 10, further comprising generating an embedding for the combination of the start text and the auxiliary text, the embedding including information as to whether an embedded token corresponds to a token in the start text or a token in the auxiliary text.

17. A non-transitory machine-readable medium comprising executable code which when executed by one or more processors associated with a computing device are adapted to cause the one or more processors to perform a method comprising:
   preparing a first text string and a second text string based on a task type of an NLP task, the task type being entailment, classification, or regression;
   generating an encoded representation of a combination of the first text string and the second text string;
   identifying a span of text within the first text string that is a result of the NLP task by:
      combining a trainable parameter vector associated with start token positions of the span of text and a portion of the encoded representation corresponding to the first text string to generate a distribution of possible start tokens for the span of text;
      selecting a start token for the span of text based on the distribution of possible start tokens for the span of text;
      combining a trainable parameter vector associated with end token positions of the span of text and the portion of the encoded representation corresponding to the first text string and generating a distribution of possible end tokens for the span of text; and
      selecting an end token for the span of text based on the distribution of possible end tokens for the span of text.

18. The non-transitory machine-readable medium of claim 17, wherein preparing the first text string comprises one or more of:
   receiving a portion of the first text string as an input when the task type is entailment or regression;
   including a list of classifications in the first text string when the task type is entailment or classification, the list of classifications being received as an input or being looked-up based on the task type; or
   including a list of similarity options in the first text string when the task type is regression.

* * * * *